(12) United States Patent
Nishiwaki et al.

(10) Patent No.: US 6,898,010 B2
(45) Date of Patent: May 24, 2005

(54) BEAM-SHAPING DEVICE, OPTICAL DISC DEVICE, AND FABRICATION METHOD OF BEAM-SHAPING DEVICE

(75) Inventors: Seiji Nishiwaki, Kobe (JP); Youichi Saitoh, Hirakata (JP); Junichi Asada, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 133 days.

(21) Appl. No.: 10/242,208

(22) Filed: Sep. 12, 2002

(65) Prior Publication Data

US 2003/0063265 A1 Apr. 3, 2003

(30) Foreign Application Priority Data

Sep. 13, 2001 (JP) ......................................... 2001-277691

(51) Int. Cl.[7] ................................................. G02B 5/18
(52) U.S. Cl. ....................................................... 359/571
(58) Field of Search .......................... 359/15, 565, 566, 359/569, 571, 574, 575

(56) References Cited

U.S. PATENT DOCUMENTS

| 5,068,751 A | * | 11/1991 | Braat et al. ................. 359/566 |
| 5,237,451 A | * | 8/1993 | Saxe ........................... 359/565 |
| 6,108,138 A | * | 8/2000 | Ophey et al. ............... 359/711 |
| 6,128,134 A | * | 10/2000 | Feldman et al. ............ 359/565 |
| 6,272,098 B1 | * | 8/2001 | Takahashi et al. ...... 369/112.17 |

FOREIGN PATENT DOCUMENTS

JP 11-232685 8/1999

OTHER PUBLICATIONS

Kato et al. "Wavelength Independent Grating Lens System", Applied Optics, vol. 28, No. 4 (Feb. 15, 1989), pp. 682–686.*

* cited by examiner

*Primary Examiner*—Mark A. Robinson
*Assistant Examiner*—Alessandro Amari
(74) *Attorney, Agent, or Firm*—RatnerPrestia

(57) ABSTRACT

The present invention provides the beam-shaping device which includes a first surface on which is formed a first grating through which a beam of light emitted from a light source on an optical axis passes; and a second surface on which is formed a second grating through which the beam of light having passed through the first surface passes; wherein the first grating and the second grating are designed, so as to maintain, when the wavelength of the emitted beam of light varies, a prescribed relationship between (1) the displacement of the first virtual light emitting point, in the first meridian plane containing the optical axis, and (2) the displacement of the second virtual light emitting point, in the second meridian plane perpendicular to the first meridian plane containing the optical axis.

12 Claims, 13 Drawing Sheets

Fig. 9 PRIOR ART

| CONDITIONS | DIFFRACTION EFFICIENCY |
|---|---|
| $d = \lambda/8$, $\Delta = 0.0\,\mu m$ | 94.96% |
| $d = \lambda/8$, $\Delta = 0.1\,\mu m$ | 90.35% |
| $d = \lambda/8$, $\Delta = 0.2\,\mu m$ | 85.87% |
| $d = \lambda/8$, $\Delta = 0.3\,\mu m$ | 81.53% |
| $d = \lambda/8$, $\Delta = 0.4\,\mu m$ | 77.35% |
| $d = \lambda/8$, $\Delta = 0.5\,\mu m$ | 73.32% |
| $d = \lambda/8$, $\Delta = 0.6\,\mu m$ | 69.44% |

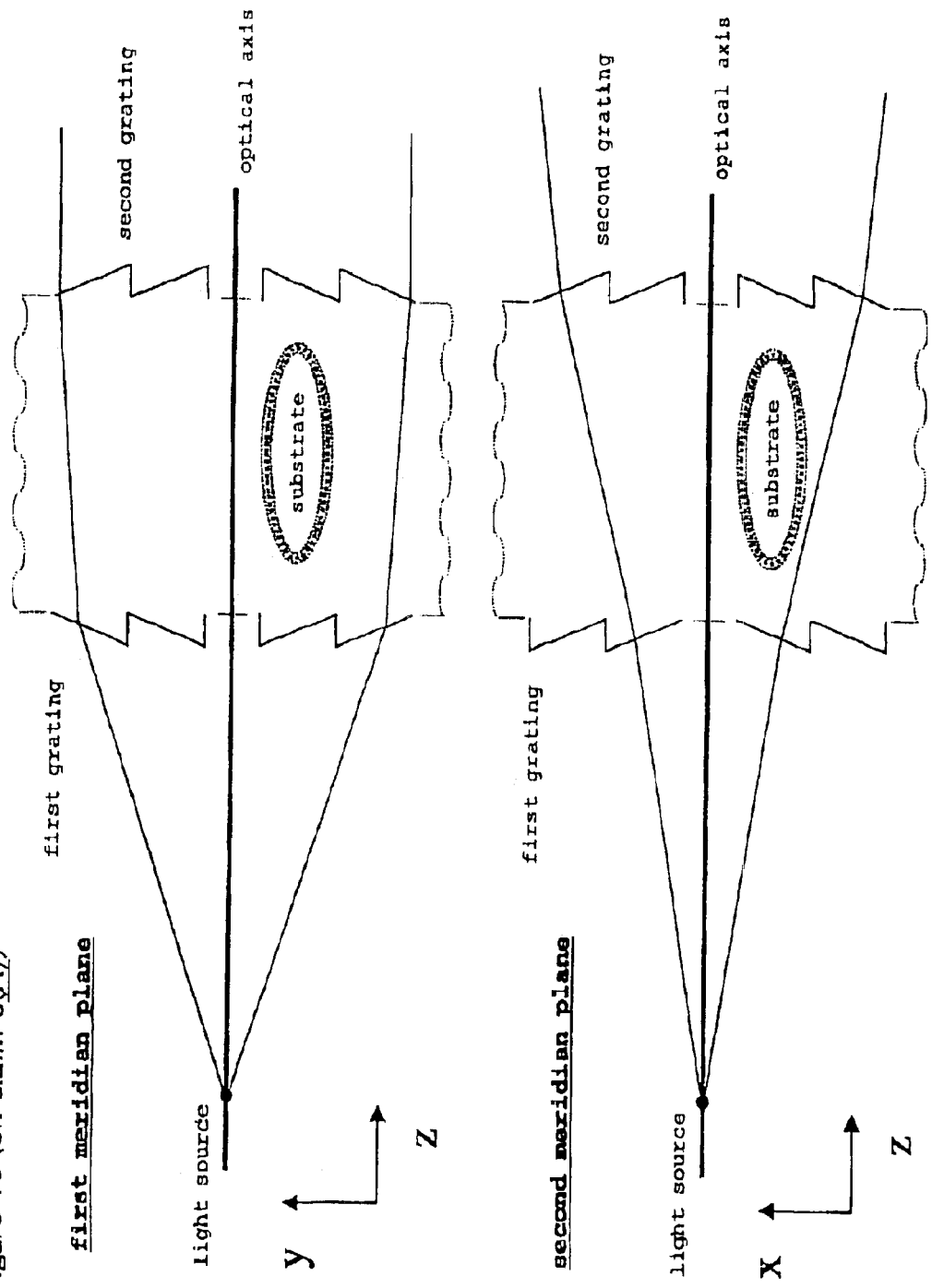
Figure 10 (cf. claim 6(A))

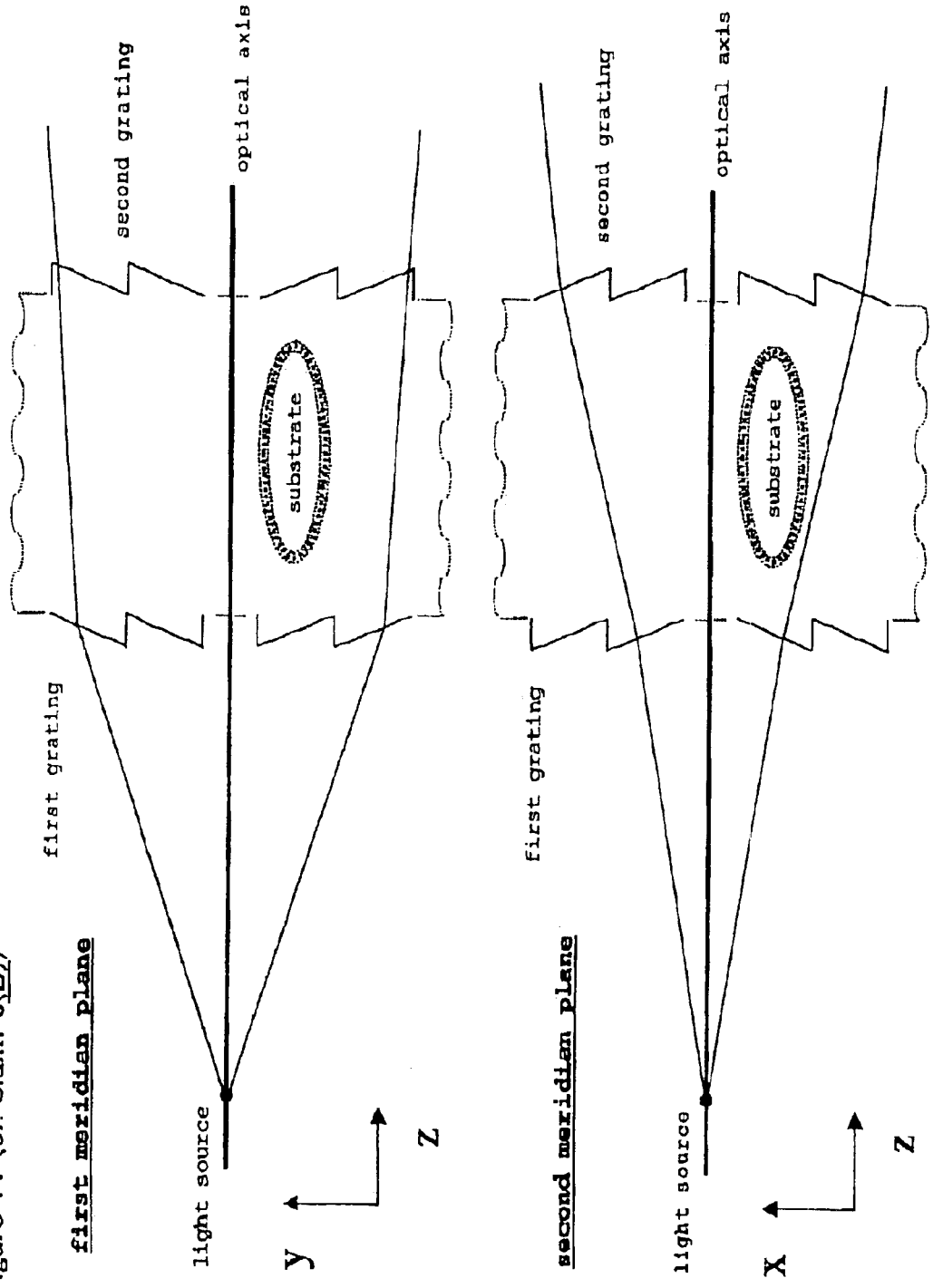
Figure 11 (cf. claim 6(B))

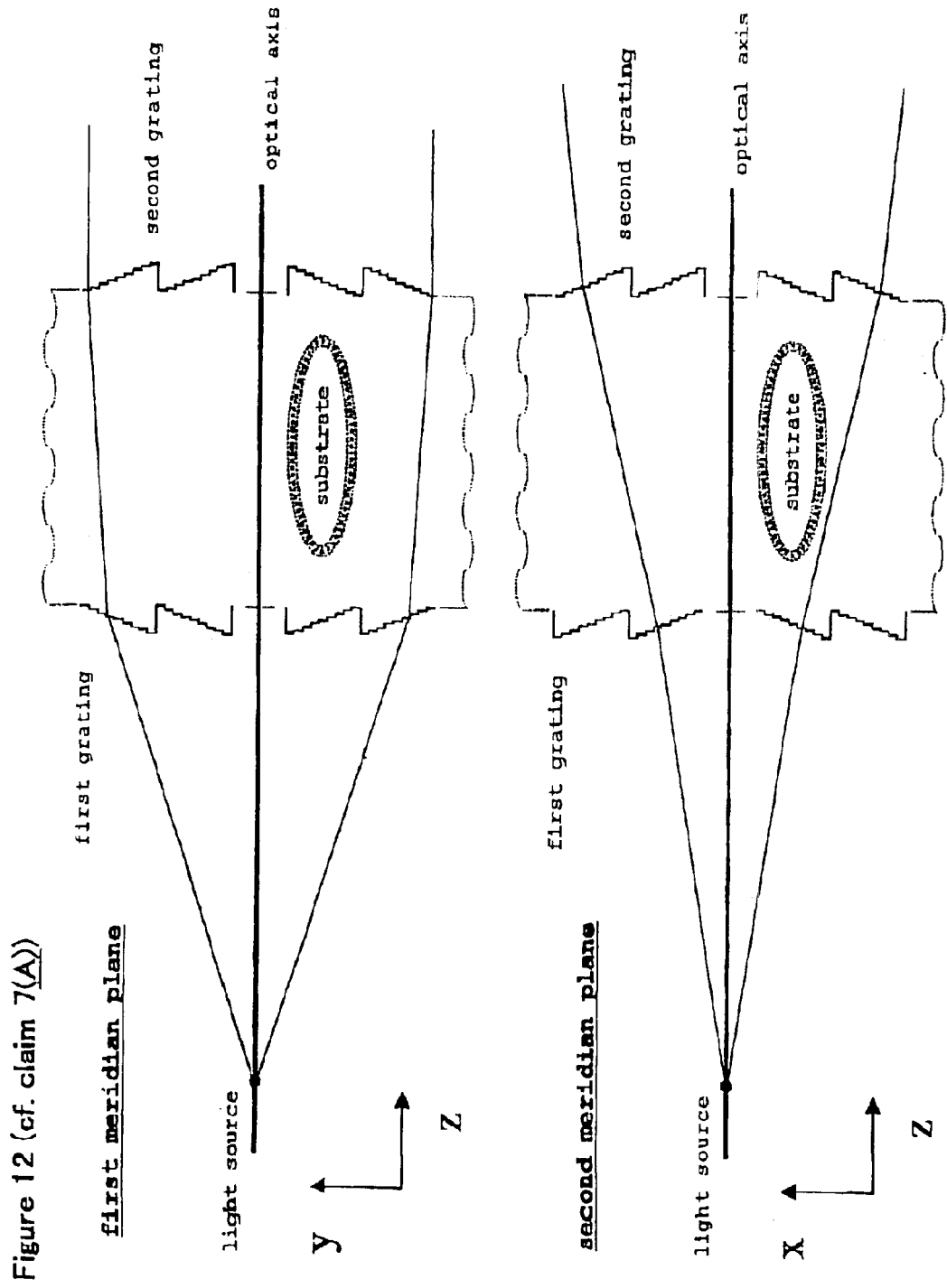
Figure 12 (cf. claim 7(A))

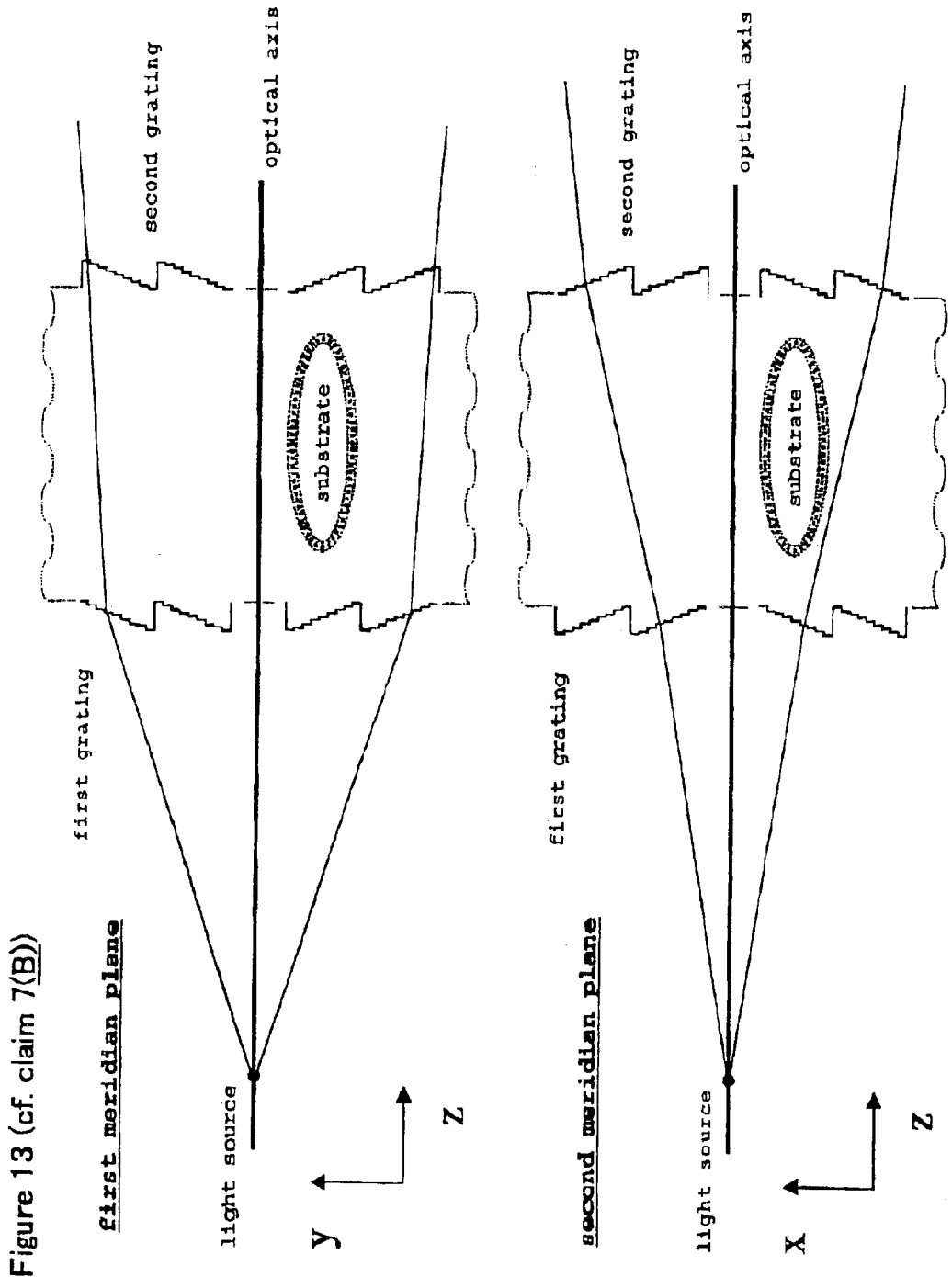

BEAM-SHAPING DEVICE, OPTICAL DISC DEVICE, AND FABRICATION METHOD OF BEAM-SHAPING DEVICE

BACKGROUND OF THE INVENTION

1. Field of the Invention

The present invention relates to a beam-shaping device, an optical disc device, and a fabrication method of a beam-shaping device, for shaping a beam of light having an elliptic intensity distribution into a beam of light having a circular intensity distribution.

2. Description of the Related Art

Description will be made below on the related art with reference to Japan Patent Laid-Open No. 11-232685 as an illustrative example.

(1) As is illustrated in FIG. 7 which shows a sectional view of the configuration of a beam-shaping device of Japan Patent Laid-Open No. 11-232685, a diffraction plane 2 gives an astigmatism to a beam of laser light emitted from a light source 1 such as a semiconductor laser or the like. Such a beam of laser light becomes equivalent to the beam of light generated from a set of focal lines 4 and 5 (namely, within the xz plane, a beam of light having the focal line 4 as a virtual light emitting point, while within the yz plane, a beam of light having the focal line 5 as another virtual light emitting point). In this connection, the focal line 4 is a focal line extending along the y axis direction, while the focal line 5 is a focal line extending a long the x axis direction.

Since the focal line 4 is closer to the diffraction plane 2 than the light source 1, the beam of laser light deflected by the diffraction plane 2 is expanded along the x axis direction. On the other hand, since the focal line 5 is further away from the diffraction plane 2 than the light source 1, the beam of laser light deflected by the diffraction plane 2 is contracted along the y axis direction.

Furthermore, the beam of laser light is deflected in optical path by a diffraction plane 3 so that the astigmatism is canceled, and becomes equivalent to the beam of light generated from a virtual light emitting point 6. By making the beam of laser light to pass through the two diffraction planes 2 and 3, it is shaped properly in expansion, where the shaping ratio m is given by the expression, $m=((L1+L3)/L1)\times(L2/(L2+L3))$. Here, L0 is the optical path length between the light source 1 and the diffraction plane 2, L1 is the optical path length between the virtual light emitting point 4 and the diffraction plane 2, L2 is the virtual light emitting point 5 and the diffraction plane 2, L3 is the optical path length between the diffraction planes 2 and 3, and L4 is the optical path length between the virtual light emitting point 6 and the diffraction plane 2.

When the diffraction planes 2 and 3 are, for example, constructed with gratings (holograms) having such a sectional shape as shown in FIG. 8, the aberration is generated by the wavelength variation in the light source. By making L2/L0=1.1 to 2.0, however, the aberration generation can be suppressed to a relatively low level.

(2) A portion of the sectional shape of the above described grating shown in FIG. 8 constitutes a staircase form of eight levels and seven steps, and the portion shown in FIG. 8 is periodically repeated to form the actual grating (namely, only one period portion is shown in the figure). Such a staircase form is fabricated by the following three processes of etching the surface of the substrate 2S (or 3S), on which surface the diffraction plane 2 (or 3) is formed; the first etching process (namely, the etching process of removing the portion 7a), the second etching process (namely, the etching process of removing the portion 7b), and the third etching process (namely, the etching process of removing the portion 7c).

By the sectional shape fabricated in a staircase form, the beam of light 8 passing through the substrate 2S (or 3S) of the diffraction plane 2 (or 3) is diffracted to be the diffracted beam of light 9. The pertinent theoretical diffraction efficiency reaches the maximum value of 94.96% when the step height d of one step is given by $d=\lambda/n$ ($\lambda$ is the wavelength of the light from the light source, n is the number of levels, and here n=8).

Such conventional beam-shaping devices and fabrication methods thereof (fabrication methods of gratings) as described above have been accompanied by the following problems.

(1) The above described condition (L2/L0=1.1 to 2.0) for cancellation of the aberration generated by the wavelength variation in the light source has been such an inaccurate condition that the condition is only applicable to a limited scope of design conditions. More specifically, the aberration generated by the wavelength variation in the light source cannot be canceled in some cases by the condition of L2/L0=1.1 to 2.0, but can be canceled in some other cases by the conditions other than L2/L0=1.1 to 2.0.

Through the above considerations, the present inventors have noticed that the conventional beam-shaping devices cannot suppress the aberration generated by the wavelength variation in the light source to a sufficiently low level.

(2) In the conventional fabrication methods of gratings, the errors in the precision for positioning of the masks in the individual etching processes lead to the formation of landings in the riser portions. Such a landing is formed, for example, in a midway portions of the deepest riser portion A. The relationship between the landing width $\Delta$ and the diffraction efficiency is such as shown in FIG. 9 (calculated on the basis of a step width of w=1 $\mu$m), and it can be seen that the diffraction efficiency is decreased drastically with increasing $\Delta$ values.

On the other hand, when landings are formed in the midway portions of all the riser portions other than the deepest riser portion A, the diffraction efficiency is calculated to be 96.03% on the basis of the step width of $\omega$=0.1 $\mu$m (see FIG. 8). In other words, the generation of the landings in the riser portions other than the deepest riser portion A has an effect to improve, rather than to degrade, the diffraction efficiency. Incidentally, when no landings are formed and all the depths of the riser portions are increased by 5%, then $d=\lambda/8\times1.05$, $\omega$=0.0 $\mu$m, $\Delta$=0.0 $\mu$m, and the diffraction efficiency is 94.20%. Thus, when the depth of the riser portion deviates from the optimal condition, the diffraction efficiency is degraded.

Through the above considerations, the present inventors have noticed that the conventional fabrication method of grating applies three times of etching processes to the deepest riser portion A, and accordingly the landing generated in the deepest riser portion A becomes broad in width, which constitutes the main factors causing the degradation of the diffraction efficiency.

SUMMARY OF THE INVENTION

An object of the present invention is to provide a beam-shaping device capable of suppressing the aberration generated by the wavelength variation in the light source, and an optical disc device, allowing for the above described problems in the conventional art.

One aspect of the present invention is a beam-shaping device which comprises:

The 1st invention of the present invention is a beam-shaping device which comprises:

a first surface having a first grating through which passes a beam of light emitted from a light emitting point on an optical axis; and a second surface having a second grating through which passes the beam of light having passed through said first surface;

wherein said first grating and said second grating are designed, so as to maintain, when the wave length of said emitted beam of light varies, a prescribed relationship between (1) the displacement of a first virtual light emitting point, in a first meridian plane containing said optical axis, associated with the beam of light having passed through said first surface and said second surface and (2) the displacement of a second virtual light emitting point, in a second meridian plane perpendicular to said first meridian plane, containing said optical axis, associated with the beam of light having passed through said first surface and said second surface.

Another aspect of the present invention is the beam-shaping device wherein said prescribed relationship refers to a relationship in which the displacement of said first virtual light emitting point and the displacement of said second virtual light emitting point are made to substantially coincide with each other.

Still another aspect of the present invention is the beam-shaping device wherein said first virtual light emitting point and said second virtual light emitting point substantially coincide with each other.

Yet still another aspect of the present invention is the beam-shaping device wherein said prescribed relationship refers to a relationship in which the ratio between the displacement of said first virtual light emitting point and the displacement of said second light emitting point is made to be substantially constant.

Still yet another aspect of the present invention is the beam-shaping device wherein said prescribed relationship refers to a relationship in which the distance between said first virtual light emitting point and said second virtual light emitting point is made to be substantially constant.

A further aspect of the present invention is the beam-shaping device wherein:

the sectional shape of said first grating is a sawtooth shape in which the sharp edges thereof look out on the side facing to said optical axis in said first meridian plane, and the sharp edges thereof look out on the side facing away from said optical axis in said second meridian plane; and the sectional shape of said second grating is a sawtooth shape in which the sharp edges thereof look out on either the side facing to or the side facing away from said optical axis in said first meridian plane, and the sharp edges thereof look out on the side facing to said optical axis in said second meridian plane.

A still further aspect of the present invention is the beam-shaping device wherein:

the sectional shape of said first grating is a staircase form inscribed in sawtooth pattern in which the sharp edges thereof look out on the side facing to said optical axis in said first meridian plane, and the sharp edges thereof look out on the side facing away from said optical axis in said second meridian plane; and the sectional shape of said second grating is a staircase form inscribed in sawtooth pattern in which the sharp edges thereof lookout on either the side facing to or the side facing away from said optical axis in said first meridian plane, and the sharp edges thereof look out on the side facing to said optical axis in said second meridian plane.

A yet further aspect of the present invention is an optical disc device comprising:

the beam-shaping device for use in shaping a beam of light; and

A still yet further aspect of the present invention is a fabrication method of a beam-shaping device comprising a surface on which is formed a grating having a sectional shape of a staircase form inscribed in sawtooth pattern, light emitted from a light emitting point on the optical axis transmitting the surface, comprising the step of forming the deepest staircase portion of said staircase form in a single etching.

The 9th invention of the present invention is a fabrication method of a beam-shaping device comprising a surface on which is formed a grating having a sectional shape of a staircase form inscribed in sawtooth pattern, light emitted from a light emitting point on the optical axis transmitting the surface, comprising the step of forming the deepest staircase portion of said staircase form in a single etching.

BRIEF DESCRIPTION OF THE DRAWINGS

FIG. 9 is a diagram illustrating the relationship between the riser depth d and landing width $\Delta$ and the diffraction efficiency associated with the conventional fabrication method of grating.

FIGS. 10–13 are cut-away plan drawings illustrating exemplary beam shaping devices according to the present invention along two meridian planes.

DESCRIPTION OF SYMBOLS

Figure 1:
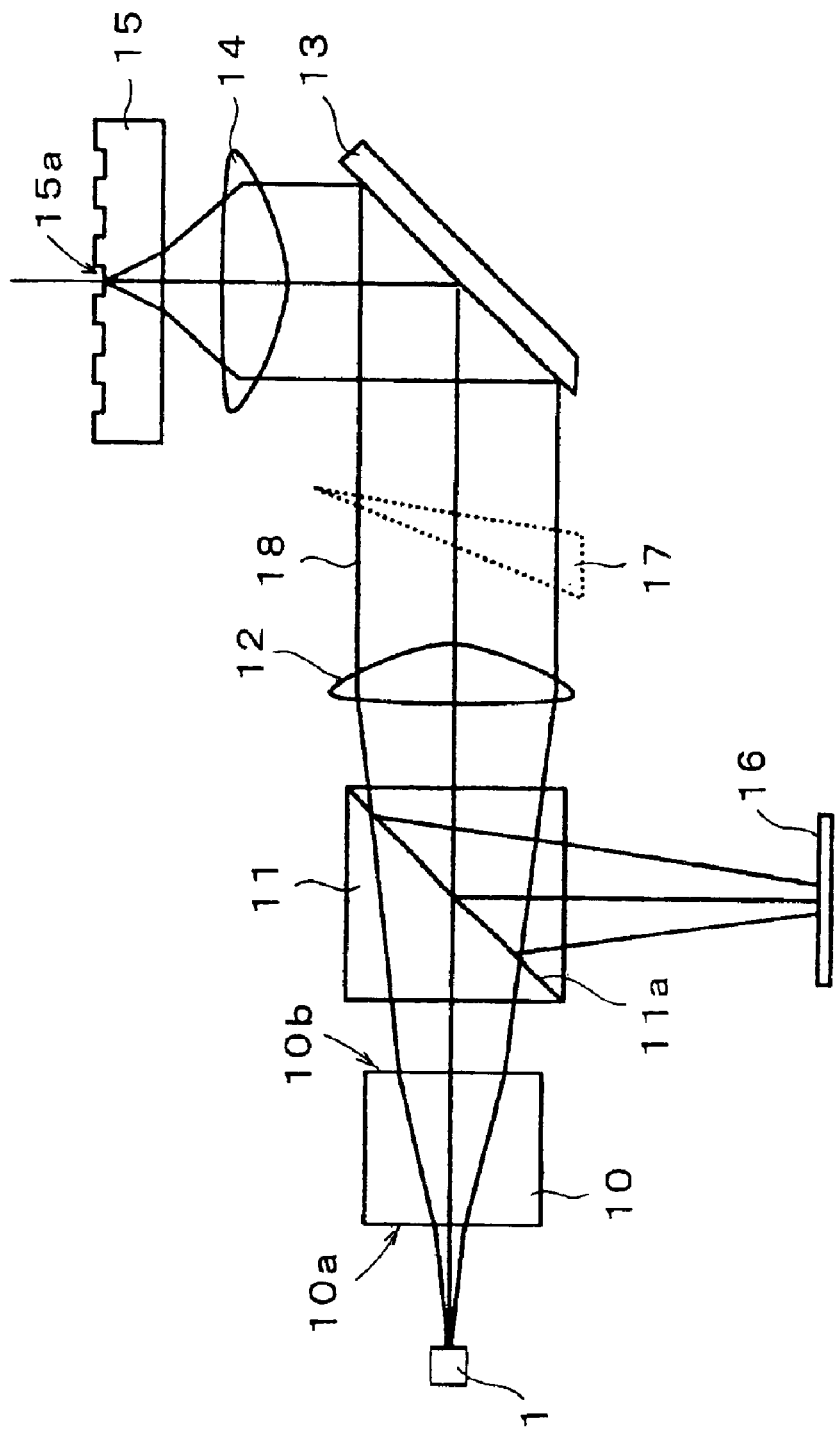
FIG. 1 is an illustrative sectional view of the configuration of an optical disk device incorporating a beam-shaping device of Embodiment 1 of the present invention.

1 SEMICONDUCTOR LASER
10 BEAM-SHAPING DEVICE
10a, 10b DIFFRACTION PLANE
11 BEAM SPLITTER
12 COLLIMATOR LENS
13 REFLECTING MIRROR
14 OBJECTIVE LENS
15 OPTICAL DISC SUBSTRATE
15a SIGNAL SURFACE

DETAILED DESCRIPTION OF THE PREFERRED EMBODIMENTS

With reference to the drawings, description will be made below on the Embodiments related to the present invention. The elements common to those in the conventional device are given the same reference numerals as in the conventional device.

(Embodiment 1)

At the beginning, with reference to FIGS. 1 and 2, the configuration and operation of a beam-shaping device will be described. FIG. 1 shows a sectional view of the configuration of an optical disc device incorporating a beam-shaping device in Embodiment 1 of the present invention, while FIG. 2 shows a sectional view of the configuration of the beam-shaping device and illustrates its operational principle.

Figure 2:
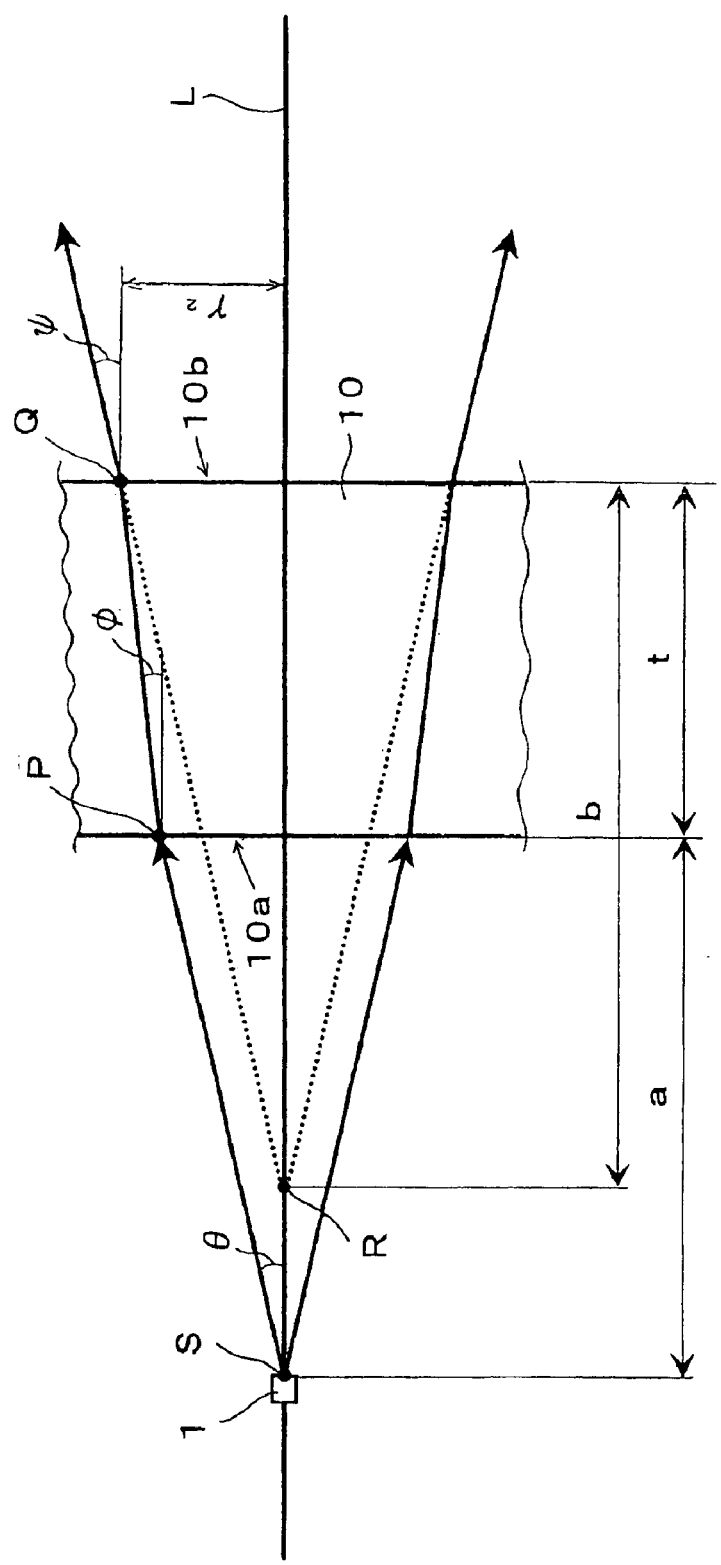
FIG. 2 is an illustrative sectional view of the configuration of a beam-shaping device and the associated principles of Embodiment 1 of the present invention.

In FIGS. 1 and 2, the beam of laser light emitted from a light source (light emitting point) 1 such as a semiconductor laser or the like is made incident on the beam-shaping device 10, diffracted on the first surface (diffraction plane) 10a and successively on the second surface (diffraction plane) 10b thereof, and becomes an outgoing beam of light (the beam of laser light) in a state of being shaped with respect to the expansion distribution.

Here, the first surface 10a corresponds to the first surface of the present invention, and the second surface 10b corresponds to the second surface of the present invention.

The beam of laser light outgoing from the beam-shaping device 10 passes through a beam splitter 11, is converted into a parallel beam of light 18 by a collimator lens 12, is reflected on a reflecting mirror 13, passes through an objective lens 14, is condensed by the objective lens 14, and is focused on the signal surface 15a of an optical disc substrate 15.

The beam of light reflected on the signal surface 15a follows backward the route of the objective lens 14, reflecting mirror 13, and collimator lens 12, is reflected on the split surface 11a of the beam splitter 11, and is received by a photodetector 16.

In FIG. 2, S denotes a light emitting point, P denotes an incidence point on the first surface of the beam-shaping device 10, Q denotes an outgoing point on the second surface, R denotes a virtual light emitting point, a is the physical distance between the light emitting point S and the first surface 10a, b is the physical distance between the virtual light emitting point R and the second surface 10b, t is the thickness of the substrate of the beam-shaping device 10, θ is the light emitting angle, φ is the refraction angle on the first surface, ψ is the refraction angle on the second surface, and $r_2$ is the height of the point Q (the distance from the optical axis L).

The refractive index of the substrate of the beam-shaping device is defined by n, the wavelength of the light from the light source by λ, the grating pitch (along an in-plane direction) on the first surface by $\Lambda_1$, the grating pitch (along an in-plane direction) on the second surface by $\Lambda_2$, the diffraction order on the first surface by $q_1$, the diffraction order on the second surface by $q_2$, and δ and ϵ are defined by the following equations:

$$\delta = b - (a + t/n) \quad \text{[Equation 1]}$$

$$\epsilon = \partial\delta/\partial\lambda = \partial b/\partial\lambda \quad \text{[Equation 2]}$$

where δ represents the location of the virtual light emitting point (given in units of mm), and ϵ is the ratio of the variation in δ, namely the displacement of the virtual light emitting point, to the variation in wavelength (the variation in δ given in units of μm corresponding to the variation in wavelength of 1 nm).

For the diffractions on the first surface 10a and the second surface 10b, the following equations hold:

$$n \cdot \sin \phi = \sin \theta - q_1 \lambda / \Lambda_1 \quad \text{[Equation 3]}$$

$$\sin \psi = n \cdot \sin \psi - q_2 \lambda / \Lambda_2 \quad \text{[Equation 4]}$$

the following equations hold from a geometrical relation:

$$a \cdot \tan \theta + t \cdot \tan \theta = b \cdot \tan \psi \quad \text{[Equation 5]}$$

$$b = r_2 / \tan \psi \quad \text{[Equation 6]}$$

$$r_2 = a \cdot \tan \theta + t \cdot \tan \theta \quad \text{[Equation 7]}$$

and the following equations hold from the above relations:

$$\partial \lambda / \partial r_2 = -n \Lambda_1 \cos^3 \phi / q_1 t \quad \text{[Equation 8]}$$

$$\partial b / \partial \lambda = \{b(\sin \theta - \sin \psi)/\sin \psi \cos^2 \psi - t(\sin \theta - n \cdot \sin \phi)/(n \cdot \tan \psi \cos^3 \phi)\}/\lambda - q_1 q_2 tb/(n \Lambda_1 \sin \psi \cos^2 \psi \cos^3 \phi) \cdot \partial(\lambda/\Lambda_2)/\partial r_2 \quad \text{[Equation 9]}$$

where $\partial(\lambda/\Lambda_2)/\partial r_2$ can be approximated by $\lambda/\Lambda_2 r_2$.

Figure 3:
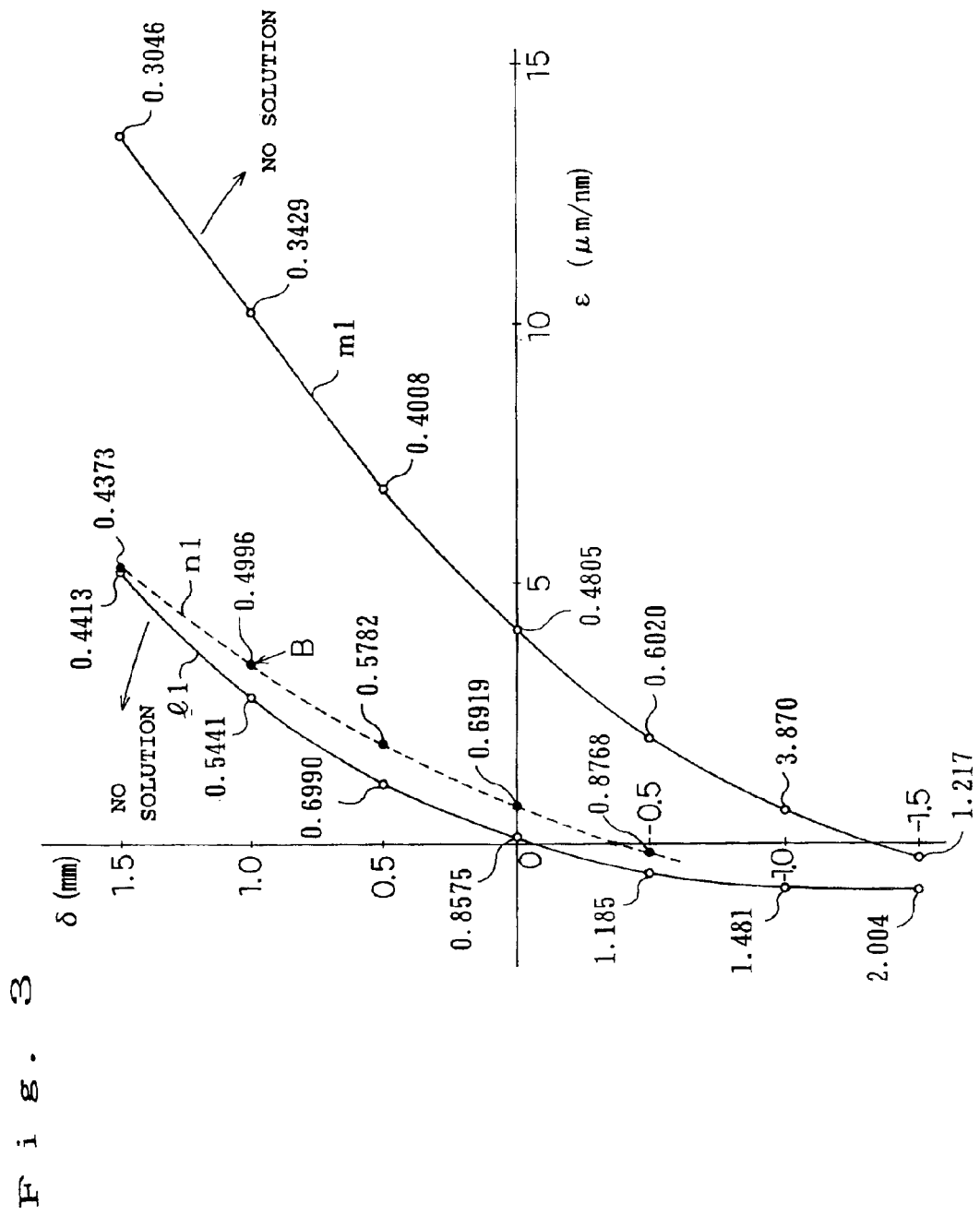
FIG. 3 is a plot graph of the sin $\psi$/sin $\theta$ values in the ($\epsilon,\delta$)-coordinate plane for the case of $q_1=1$ and $q_2=-1$ in Embodiment 1 of the present invention.
Figure 4:
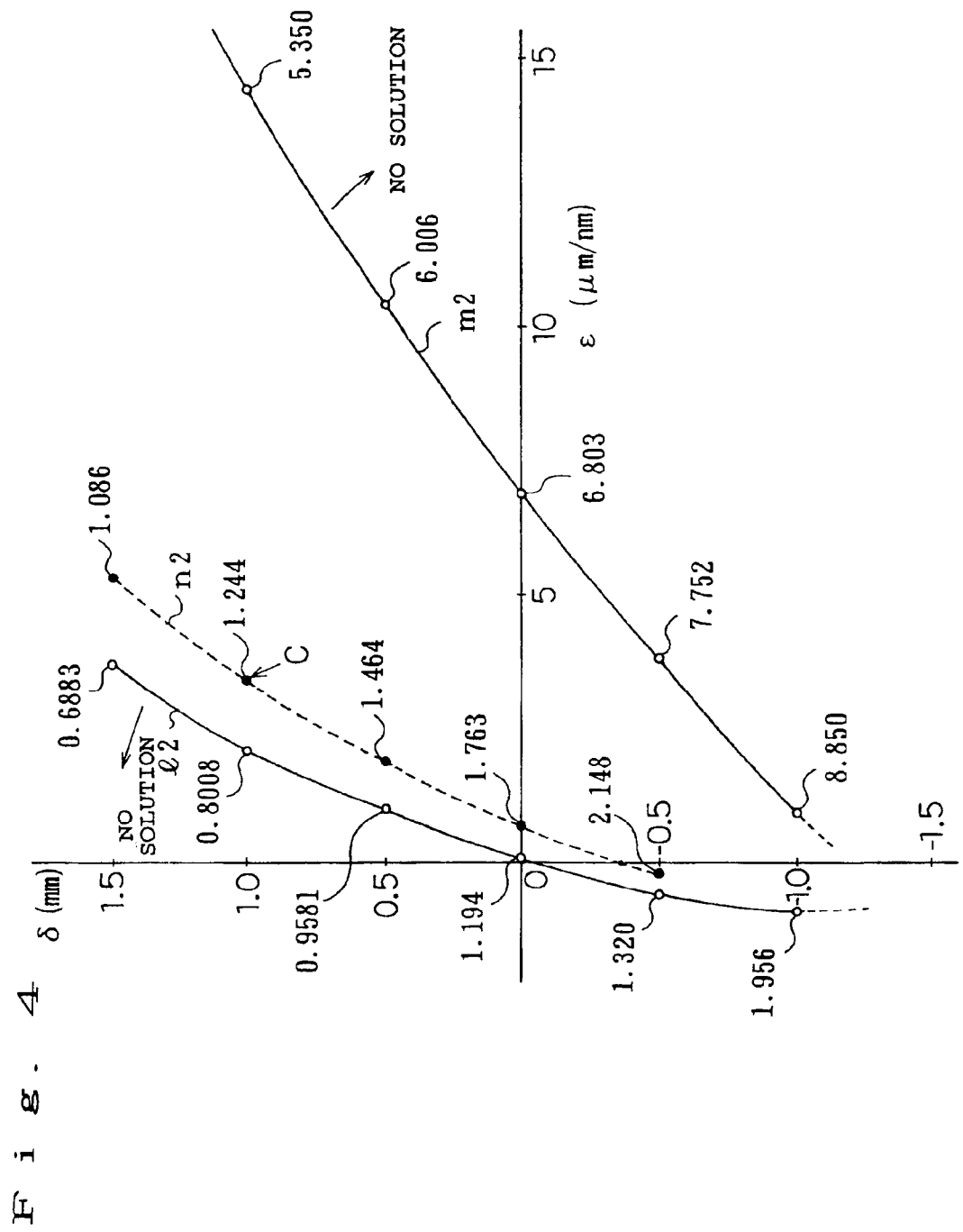
FIG. 4 is a plot graph of the sin $\psi$/sin $\theta$ values in the ($\epsilon,\delta$)-coordinate plane for the case of $q_1=-1$ and $q_2=1$ in Embodiment 1 of the present invention.
Figure 5:
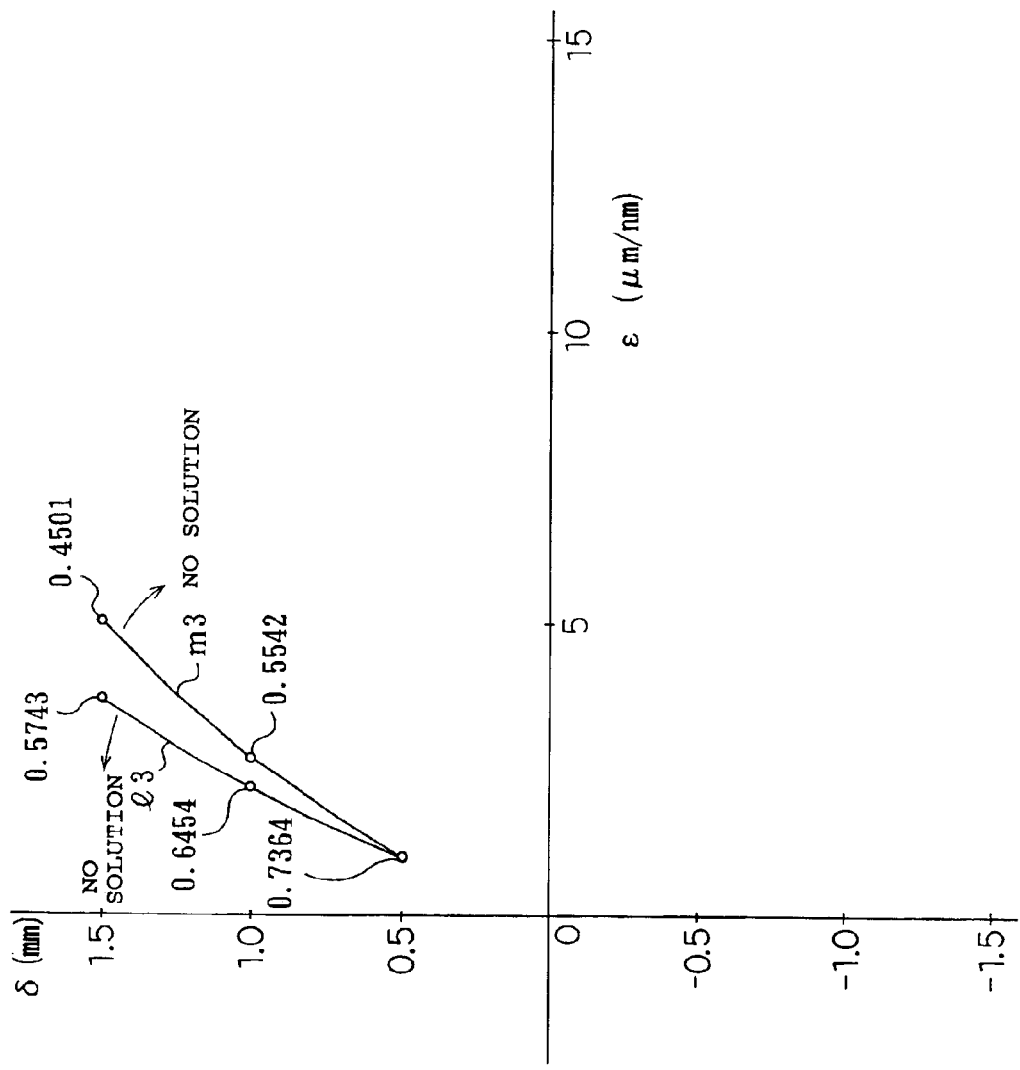
FIG. 5 is a plot graph of the sin $\psi$/sin $\theta$ values in the ($\epsilon,\delta$)-coordinate plane for the case of $q_1=1$ and $q_2=1$ in Embodiment 1 of the present invention.

Any of ψ, b, and ∂b/∂λ is a function of $q_1$ and $q_2$. The quantities of $q_1$ and $q_2$ can independently select the values of ±1 (+1 corresponds to the diffraction with inclination to the optical axis L, while −1 the diffraction with reverse inclination), so that there are four patterns of combinations of $q_1$ and $q_2$. FIGS. 3 to 5 are the graphs of the plots of sin ψ/sin θ against each of $q_1$ and $q_2$ in the (ϵ, δ)-coordinate plane, where n=1.50, θ=5.0 degrees, a=1.2 mm, t=2.0 mm, and λ=0.66 μm. FIG. 3 corresponds to the case of $q_1$=1 and $q_2$=−1, FIG. 4 to the case of $q_1$=−1 and $q_2$=1, and FIG. 5 to the case of $q_1$=1 and $q_2$=1. The case of $q_1$=−1 and $q_2$=−1 has no solution, so that no graph is shown.

FIGS. 10–13 illustrate exemplary beam shaping devices according to the present invention. Each of these Figures includes cut-away views of one of the exemplary beam shaping devices through its center along a first meridian plane, the Y axis, and along a second meridian plane, the X axis. In the exemplary beam shaping device of FIG. 10, the first grating on the first surface of the beam shaping device substrate and the second grating on the second surface of the beam shaping device substrate are shown to have sawtooth sectional shapes with sharp edges facing toward the optical axis in the first meridian plane. In the second meridian plane, the sharp edges of the sawtooth sectional shape of the second grating also face toward the optical axis, but the sharp edges of the sawtooth sectional shape of the first grating face away from the optical axis. The exemplary beam shaping device of FIG. 11 is the same that of FIG. 10, except that the sharp edges of the sawtooth sectional shape of the second grating face away from the optical axis in the first meridian plane. The exemplary beam shaping devices of FIGS. 12 and 13 are the same are the same as those of FIGS. 10 and 12, respectively, except that the gratings of the exemplary beam shaping devices of FIGS. 12 and 13 have stepped sawtooth, staircase, sectional shapes.

In FIG. 3, there are solutions in the region between the curves l1 and m1, whereas there is no solution in outside the region. In FIG. 4, there are solutions in the region between the curves l2 and m2, whereas there is no solution in outside the region. In FIG. 5 there are solutions in the region between the curves l3 and m3, whereas there is no solution in outside the region.

The condition that there is no initial stage aberration means that there is coincidence between the virtual light emitting point on the meridional plane (for example, the surface of the plane of paper in FIG. 2) and that on the sagittal plane (a plane inclusive of the optical axis L and perpendicular to the meridional plane). The condition that there is no chromatic aberration means that the displacement of the light emitting point on the meridional plane caused by wavelength variation is equal to that on the sagittal plane (since FIG. 2 is a general representation, the plane of paper may be taken as either the meridional plane or the sagittal plane).

Incidentally, these above conditions are the conditions holding when such elements as a wedge prism 17 and the like are not used.

Accordingly, with the subscript M denoting the meridional plane and the subscript S denoting the sagittal plane, the condition that there is no initial stage aberration is represented by $b_M = b_S$ (namely, $\delta_M = \delta_S$), and the condition that there is no chromatic aberration is represented by $\partial b_M/\partial \lambda = \partial b_S/\partial \lambda$ (namely, $\epsilon_M = \epsilon_S$) Herewith, the beam shaping ratio can be represented by $m = \sin \psi_M / \sin \psi_S$.

The meridional plane of the present Embodiment corresponds to the first meridian plane of the present invention, while the sagittal plane of the present Embodiment corresponds to the second meridian plane of the present invention.

In the present Embodiment, the sagittal plane coincides with the plane of polarization (the plane in which the light emitting angle is smaller). The beam-shaping device 10 is so designed that the grating in the meridional plane corresponds to the point B(3.5, 1.0) in FIG. 3 and the grating in the sagittal plane corresponds to the point C(3.5, 1.0) in FIG. 4.

Thus, in the meridional plane, the diffraction with inclination to the optical axis L is followed by the diffraction with reverse inclination, while in the sagittal plane, the diffraction with inclination away from the optical axis L is followed by the diffraction with reverse inclination.

Since $\epsilon$ and $\delta$ of the point B coincide respectively with $\epsilon$ and $\delta$ of the point C, there are satisfied both the condition that there is no initial stage aberration and the condition that there is no chromatic aberration.

On the point B(3.5, 1.0), $\sin \psi_S / \sin \theta = 0.4996$, while on the point C(3.5, 1.0), $\sin \psi_M / \sin \theta = 1.244$, and hence the expansion angle is decreased in the meridional plane, whereas it is increased in the sagittal plane. Eventually, in total, the beam shaping ratio of $m = 1.244/0.4996 = 2.50$ fold is attained.

Incidentally, in general, with increasing wavelengths, the refractive indexes of the glass materials composing the collimator lens 12 and the objective lens 14 decrease (so-called dispersion effect). Consequently, when the light emitting point of the light source is invariant, the focal point location on the signal surface of an optical disc 15a is displaced away from the objective lens 14 (for example, the wavelength increment of 1 nm causes the displacement of 0.2 µm in the focal point location).

In the beam-shaping device 10 of the present Embodiment, $\epsilon = 1.0$ (µm/nm) and hence the wavelength increment of 1 nm causes the displacement of the virtual light emitting point of 1.0 µm away from the collimator lens 12. This displacement is directed so as to reduce the dispersion effects due to the collimator lens 12 and objective lens 14, and thus the displacement of the focal point on the signal surface 15a of an optical disc can be canceled in the total optical system.

Needless to add, the $\epsilon$ and $\delta$ values on the meridional and sagittal planes can be made to be respectively equal to each other, a combination other than that of the point B and C can satisfy the condition that there is no initial stage aberration and the condition that there is no chromatic aberration.

For example, on the curve n1 in FIG. 3 and the curve n2 in FIG. 4, a shaping with maintaining the relation that the shaping ratio m=2.5 can be made.

Furthermore, even in a combination of FIG. 5 and FIG, 4, when the $\epsilon$ and $\delta$ values are respectively can be made identical, similar effects can be obtained. In this case, in the meridional plane, the diffraction with inclination to the optical axis L is followed by the diffraction with the inclination to the same side, while in the sagittal plane, the diffraction with inclination away from the optical axis L is followed by the diffraction with reverse inclination.

Figure 6:
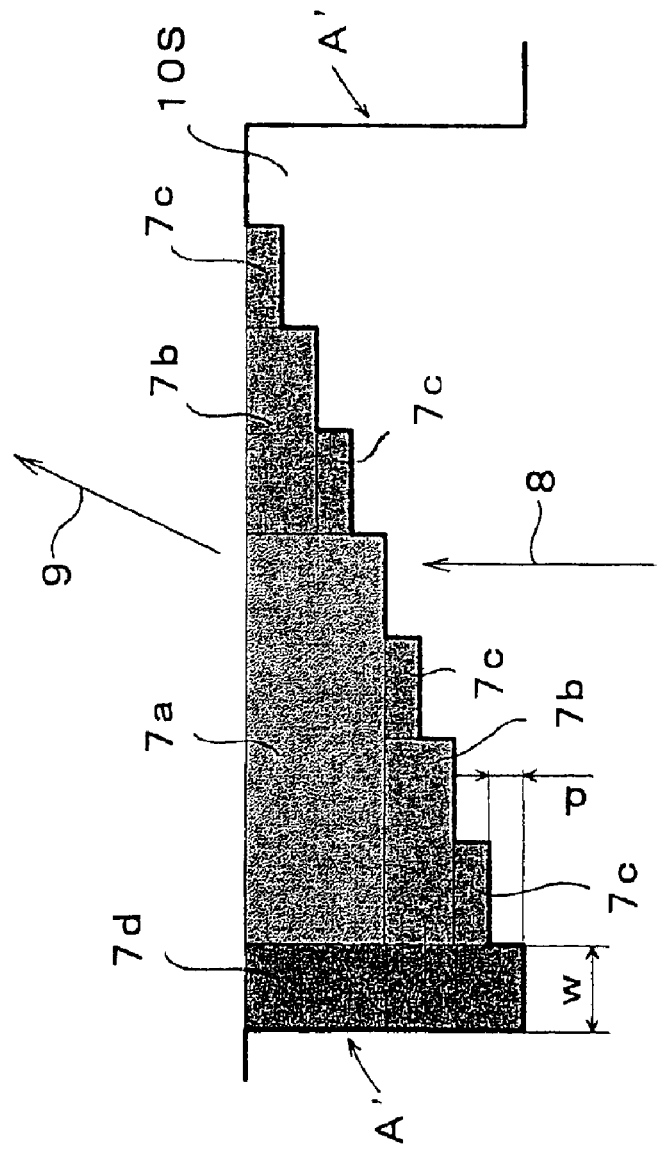
FIG. 6 is an illustrative view of the sectional shape of the grating in a beam-shaping device in Embodiment 1 of the present invention.
Figure 7:
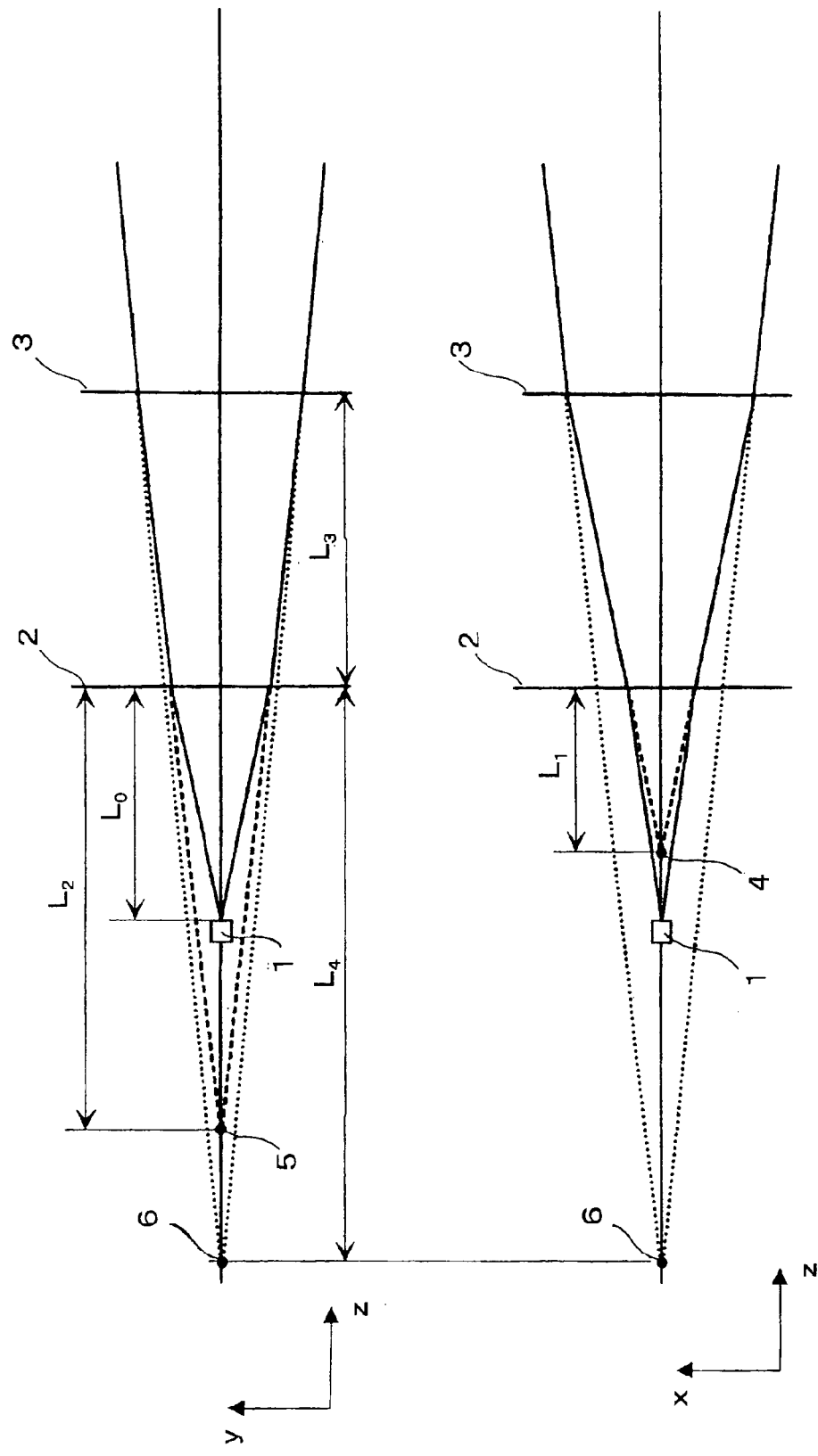
FIG. 7 is an illustrative sectional view of the configuration of a beam-shaping device in the conventional art.
Figure 8:
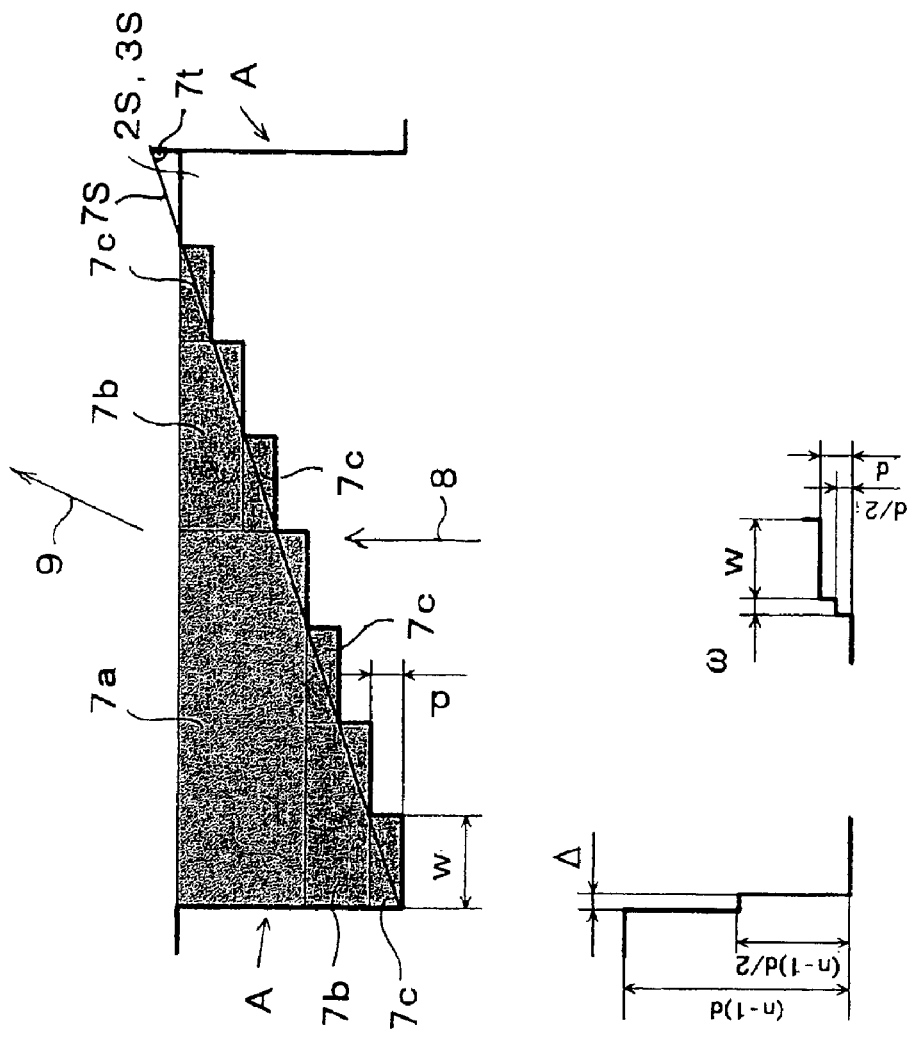
FIG. 8 is an illustrative view of the sectional shape of the grating in a conventional beam-shaping device.

FIG. 6 shows a sectional shape of a grating having a staircase form inscribed in sawtooth pattern 7S (FIG. 8). By taking advantage of such a staircase form, the incident beam of light 8 can be made to be the beam of light 9 diffracted to the direction of the sharp edges 7t (FIG. 8) looking out on the side facing to the optical axis (not shown in the figure) which is present on the right portion of the sharp edges 7t in the figure, with the sawtooth pattern 7S having the sharp edges 7t looking out the side facing to the optical axis.

To sum up, the diffraction direction of the beam of light is, (1) the direction facing to the optical axis when the sharp edges look out on the side facing to the optical axis, in the sectional shape of the sawtooth pattern of the grating, and (2) the direction facing away from the optical axis when the sharp edges look out on the side facing away from the optical axis, in the sectional shape of the sawtooth pattern of the grating.

In FIG. 6, a staircase form of 9 levels and 8 steps is periodically formed (only one period portion is shown in the figure). This staircase form is fabricated by the following four processes of etching the surface of the substrate 10S of the beam-shaping device 10; the first etching process (namely, the etching process of removing the portion 7a), the second etching process (namely, the etching process of removing the portion 7b), the third etching process (namely, the etching process of removing the portion 7c), and the fourth etching process (namely, the etching process of removing the portion 7d). Incidentally, the order of the above etching processes may be optional.

By making the sectional shape to be a staircase form, the beam of light 8 passing through the substrate 10S of the beam-shaping device 10 is diffracted to be the diffracted beam of light 9. The pertinent theoretical diffraction efficiency reaches the maximum value of 96.00% when the step height d of one step is given by $d = \lambda/n$ ($\lambda$ is the wavelength of the light from the light source, n is the number of levels, and here n=9).

In the present Embodiment, the deepest riser portion A' is formed only by one etching process 7d. Consequently, here is no formation of such landings, as seen in the conventional examples, caused by the errors in the precisions in positioning the masks in individual etching processes of the conventional methods, and hence there occurs no such degradation of diffraction efficiency as seen in the conventional examples.

Incidentally, FIG. 6 shows an example in which the 8+1=9 levels are formed (an example having a process of etching the deepest riser portion in addition to the conventional 8 level process), and other examples of fabricating the deepest riser portion by one etching process (for example, a 4+1=5 level process and a 16+1=17 level process) achieve the similar effects.

Needless to say, the sectional shape of a grating may not be a staircase form inscribed in a sawtooth pattern 7S, but it may be a sawtooth pattern 7S itself (a so-called blazed grating).

In the above description, detailed description has been made on Embodiment 1.

In Embodiment 1 described above, the $\epsilon$ and $\delta$ values in the meridional plane are taken to be respectively equal to the $\epsilon$ and $\delta$ values in the sagittal plane, but it is not necessarily required that the $\epsilon$ and $\delta$ values in the meridional plane be taken to be respectively equal to the $\epsilon$ and $\delta$ values in the sagittal plane.

(A) As an example, here is considered a case in which a wedge prism 17 is interposed between the collimator lens 12 and the reflecting mirror 13, as shown in FIG. 1.

The displacement of the virtual light emitting point caused by the wavelength variation transforms the beam of light having passed through the collimator lens 12 from an infinite system (parallel beam of light) into a finite system (a divergent or convergent beam of light). Thus, the finite system of light passes through the wedge prism 17 to generate an astigmatism (such an astigmatism is referred to as the aberration 1).

On the other hand, when the $\epsilon(=\epsilon_M)$ on the meridional plane is drawn away from the $\epsilon(=\epsilon_S)$ on the sagittal plane, the wavelength variation generates an astigmatism (such an astigmatism is referred to as the aberration 2).

The magnitude of the aberration 1 is proportional to the average value of the $\epsilon$ values on the meridional and sagittal planes, $(\epsilon_M+\epsilon_S)/2$, while the magnitude of the aberration 2 is proportional to the difference between the two $\epsilon$ values, $\epsilon_M-\epsilon_S$.

Thus, with $\alpha$ representing the magnitude of the aberration 1 and $\beta$ representing the magnitude of the aberration 2, the following expressions hold:

$$\alpha \propto \epsilon_M+\epsilon_S \quad \text{[Equation 10]}$$

$$\beta \propto \epsilon_M-\epsilon_S \quad \text{[Equation 11]}$$

Accordingly, in order to cancel the aberration 1 with the aberration 2, the relation $\alpha=\beta$ is required to hold.

$$(\epsilon_M-\epsilon_S)/(\epsilon_M+\epsilon_S)=\gamma \quad \text{[Equation 12]}$$

where $\gamma$ is a constant value determined by $\alpha$ and $\beta$.

By recasting equation (12), the following equation is obtained:

$$\epsilon_M/\epsilon_S=(1+\gamma)/(1-\gamma) \quad \text{[Equation 13]}$$

From this equation, it can be seen that by properly setting the ratio between $\epsilon_M$ and $\epsilon_S$, the aberration 1 can be canceled with the aberration 2.

In other words, the ratio of the displacement of the virtual light emitting point on the meridional plane to the displacement of the virtual light emitting point on the sagittal plane may be set to be substantially constant.

(B) When in the initial stage the beam of light having passed through the collimator lens 12 is a finite system, the astigmatism is generated in the initial stage by passing through the wedge prism 17. This aberration can be canceled with the astigmatism generated by the design in which $\delta(=\delta_M)$ on the meridional plane is drawn away from the $\delta(=\delta_S)$ on the sagittal plane.

In other words, the distance between the virtual light emitting point on the meridional plane and the virtual light emitting point on the sagittal plane may be set to be substantially constant.

In the above, descriptions have been made separately on the two cases, (A) the $\epsilon$ value on the meridional plane is made to be different from the $\epsilon$ value on the sagittal plane, and (B) the $\delta$ value on the meridional plane is made to be different from the $\delta$ value on the sagittal plane, but these two cases may be made to hold simultaneously. In other words, while canceling the initial stage aberration as caused by the whole optical system through making the two $\delta$ values to be different from each other, the aberration generated during wavelength variation by the whole optical system may be canceled by making the two $\epsilon$ values to be different from each other.

Similar observations to those described above are also applicable to the cases where are used, in addition to the case of using a wedge prism, configurations in which the displacement of the virtual light emitting point causes the aberration (for example, a configuration incorporating a collimator lens having a shape of a combination of an anamorphic curved surface and a cylindrical curved surface, a configuration incorporating a combination of a wedge prism and a hologram, or the like).

The configuration as describe above, the aberration generated by the beam-shaping device can be canceled by making the displacement of the first virtual light emitting point in the first meridian plane to substantially coincide with the displacement of the second virtual light emitting point in the second meridian plane, both caused by the wavelength variation in the light source. In addition, the aberration generated in an optical disc device using a beam-shaping device can be canceled by making the ratio of the displacement of the first virtual light emitting point to the displacement of the second virtual light emitting point to be substantially constant. Furthermore, the initial stage aberration in the beam-shaping device can be made to decrease by making the location of the first virtual light emitting point on the first meridian plane to substantially coincide with the location of the second virtual light emitting point on the second meridian plane. Additionally, the initial stage aberration in an optical disc device using a beam-shaping device can be made to decrease by making the distance between the location of the first virtual light emitting point and the location of the second virtual light emitting point to be substantially constant. Furthermore, the displacements of the first virtual light emitting point and the second virtual light emitting point can serve to correct the chromatic aberration generated by other optical members in the optical disc device, and also to reduce the displacement of the focal point during wavelength variation. In addition, no landings are formed in the deep riser portions, and hence the grating degradation in diffraction efficiency can be suppressed to a low level.

As described above, while the expansion distribution of the beam of light being shaped through diffraction, not only the aberration generation in the beam-shaping device generated by the wavelength variation of the light source, but also the aberration generation in the whole system of the optical disk device can be canceled. In addition, while shaping the expansion distribution of the beam of light through diffraction, not only the initial stage aberration in the beam-shaping device, but also the initial stage aberration in the whole system of the optical disk device can be canceled. Furthermore, the displacement of the focal point location during wavelength variation can be made small by correcting the chromatic aberration generated in the other optical members of the optical disk device. In addition, the degradation in diffraction efficiency in a grating caused by the errors in fabrication can be suppressed to a low level.

The entire disclosure of the above literature is incorporated herein by reference (i.e. Japan Patent Laid-Open No. 11-232685) in its entirety.

As can be seen clearly from above, the present invention has an advantage that the aberration in a beam-shaping device generated by the wavelength variation in the light source can be suppressed to a more advanced degree.

Additionally, the present invention has an advantage that the diffraction efficiency in a beam-shaping device can be improved to a more advanced degree.

What is claimed is:

1. A beam-shaping device which comprises:
a first surface having a first grating through which passes a beam of light emitted from a light emitting point on an optical axis; and
a second surface having a second grating through which passes the beam of light having passed through said first surface;
wherein said first grating and said second grating are designed, so as to maintain, when the wavelength of said emitted beam of light varies, a prescribed relationship between (1) the displacement of a first virtual light emitting point, in a first meridian plane containing said optical axis, associated with the beam of light having passed through said first surface and said second surface and (2) the displacement of a second virtual light emitting point, in a second meridian plane perpendicular to said first meridian plane, containing said optical axis, associated with the beam of light having passed through said first surface and said second surface,
wherein a sectional shape of said first grating is a sawtooth shape with sharp edges facing toward said optical axis in said first meridian plane, and sharp edges facing away from said optical axis in said second meridian plane, and
a sectional shape of said second grating is a sawtooth shape with sharp edges either (A) facing toward said optical axis in said first meridian plane or (B) facing away from said optical axis in said first meridian plane, and sharp edges facing toward said optical axis in said second meridian plane.

2. The beam-shaping device according to claim 1 wherein said prescribed relationship refers to a relationship in which the displacement of said first virtual light emitting point and the displacement of said second virtual light emitting point are made to substantially coincide with each other.

3. The beam-shaping device according to claim 2 wherein said first virtual light emitting point and said second virtual light emitting point substantially coincide with each other.

4. The beam-shaping device according to claim 1 wherein said prescribed relationship refers to a relationship in which the ratio between the displacement of said first virtual light emitting point and the displacement of said second light emitting point is made to be substantially constant.

5. The beam-shaping device according to claim 1 wherein said prescribed relationship refers to a relationship in which the distance between said first virtual light emitting point and said second virtual light emitting point is made to be substantially constant.

6. An optical disc device comprising:
the beam-shaping device according to claim 1 for use in shaping a beam of light; and
a lens for focusing said shaped beam of light;
wherein said prescribed relationship is a relationship in which the displacement of the focal point and/or the aberration of said beam of light in the case of the wavelength of said emitted beam of light varied is made to be reduced.

7. A beam-shaping device which comprises:
a first surface having a first grating through which passes a beam of light emitted from a light emitting point on an optical axis; and
a second surface having a second grating through which passes the beam of light having passed through said first surface;
wherein said first grating and said second grating are designed, so as to maintain, when the wavelength of said emitted beam of light varies, a prescribed relationship between (1) the displacement of a first virtual light emitting point, in a first meridian plane containing said optical axis, associated with the beam of light having passed through said first surface and said second surface and (2) the displacement of a second virtual light emitting point, in a second meridian plane perpendicular to said first meridian plane, containing said optical axis, associated with the beam of light having passed through said first surface and said second surface,
wherein a sectional shape of said first grating is a staircase form inscribed in sawtooth pattern with sharp edges facing toward said optical axis in said first meridian plane, and sharp edges facing away from said optical axis in said second meridian plane; and
a sectional shape of said second grating is a staircase form inscribed in sawtooth pattern with sharp edges either (A) facing toward said optical axis in said first meridian plane or (B) facing away from said optical axis in said first meridian plane, and sharp edges facing toward said optical axis in said second meridian plane.

8. The beam-shaping device according to claim 7 wherein said prescribed relationship refers to a relationship in which the displacement of said first virtual light emitting point and the displacement of said second virtual light emitting point are made to substantially coincide with each other.

9. The beam-shaping device according to claim 8 wherein said first virtual light emitting point and said second virtual light emitting point substantially coincide with each other.

10. The beam-shaping device according to claim 7 wherein said prescribed relationship refers to a relationship in which the ratio between the displacement of said first virtual light emitting point and the displacement of said second light emitting point is made to be substantially constant.

11. The beam-shaping device according to claim 7 wherein said prescribed relationship refers to a relationship in which the distance between said first virtual light emitting point and said second virtual light emitting point is made to be substantially constant.

12. An optical disc device comprising:
the beam-shaping device according to claim 7 for use in shaping a beam of light; and
a lens for focusing said shaped beam of light;
wherein said prescribed relationship is a relationship in which the displacement of the focal point and/or the aberration of said beam of light in the case of the wavelength of said emitted beam of light varied is made to be reduced.

* * * * *